Jan. 21, 1947.    N. C. CHRISTENSEN    2,414,718
GAS WASHER
Filed April 26, 1944    2 Sheets-Sheet 1
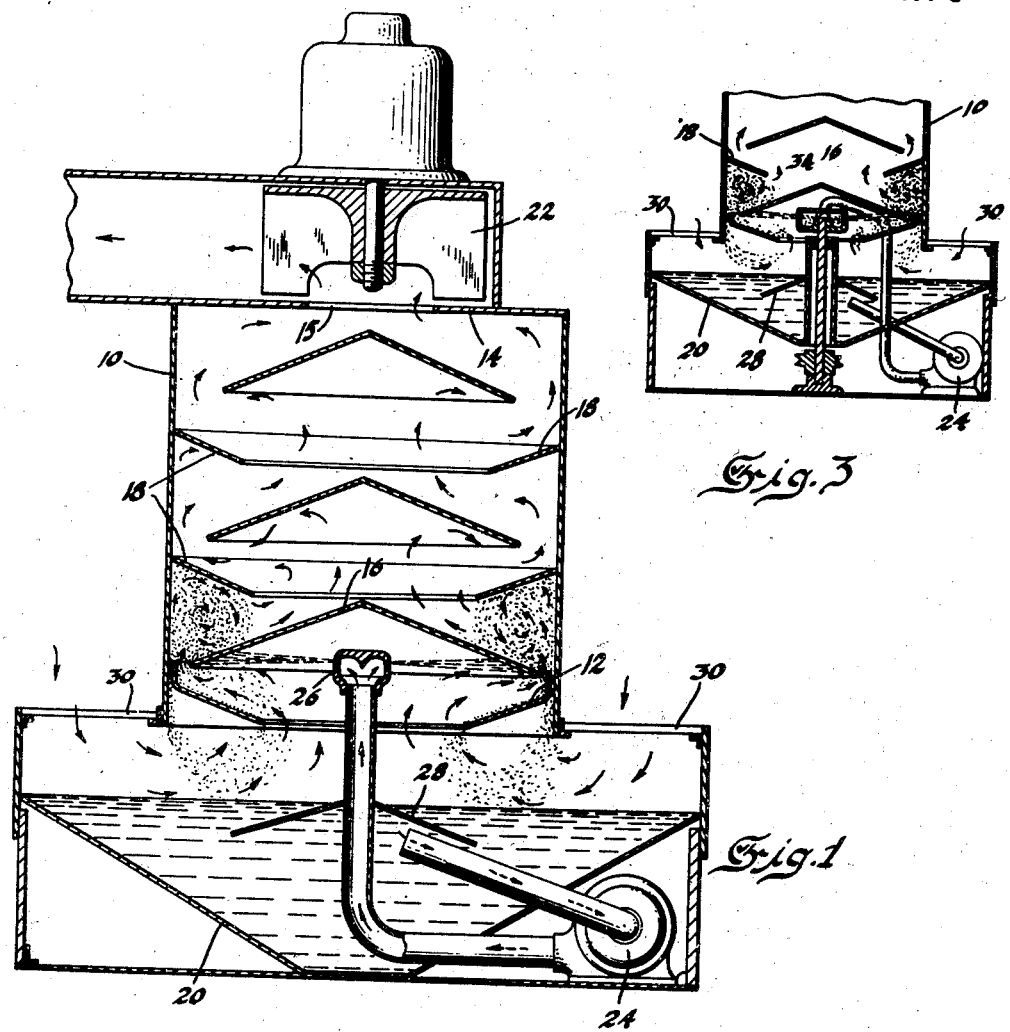
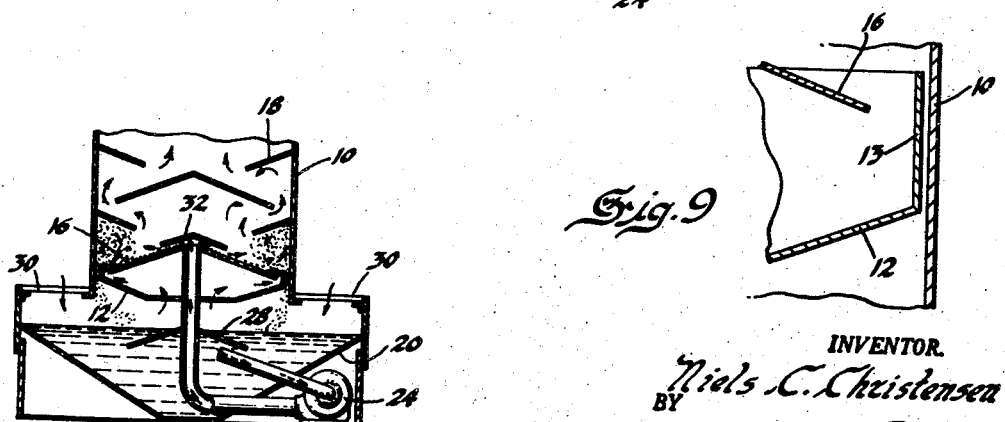
INVENTOR.
Niels C. Christensen
BY Parker & Burton
attorneys Jan. 21, 1947.   N. C. CHRISTENSEN   2,414,718
GAS WASHER
Filed April 26, 1944   2 Sheets-Sheet 2

INVENTOR.
Niels C. Christensen
BY
Parker & Barton
attorneys

Patented Jan. 21, 1947

2,414,718

UNITED STATES PATENT OFFICE 2,414,718

GAS WASHER

Niels C. Christensen, Salt Lake City, Utah

Application April 26, 1944, Serial No. 532,759

10 Claims. (Cl. 261—111)

This invention relates to an improved apparatus for washing gas with liquid to remove foreign particles from the gas.

It relates particularly to mechanisms employed for the removal of suspended particles from the air in industrial plants. Such foreign particles may be finely divided solids formed in grinding, polishing and buffing, spray painting, and similar operations in which relatively small particles of solids, emulsions or liquids, are formed, and dispersed into the air. Though especially applicable in this field the invention is useful generally for the removal or collection of foreign particles from gas such as air.

Various different methods of and mechanisms for wet washing gas to remove foreign particles suspended therein have heretofore been used. I have found that a very effective method of washing gases and removing foreign particles therefrom within a relatively small space and within a relatively compact apparatus consists in creating an improved vortex-like suspension of particles of water (or other suitable liquids) of a variety of sizes i. e. a swirling vortex-like mixture of mist, fine spray, coarse spray or rain and larger irregular masses mixed with the gases to be cleaned and through which the gases to be cleaned are passed. An object of my invention is to establish and maintain a steady, constant, and uniform liquid vortex through which the gas to be cleaned is uniformly passed. Such vortex is created by so controlling and directing the flow of gas to be cleaned and by so exposing liquid thereto to be picked up thereby, that uniformity of functioning is attained. The gas stream picks up the liquid and is so directed as to create a liquid vortex therein.

To be most effective such a vortex should be steady in operation and uniform within the path or passage offered for the gases through the vortex i. e. the vortex must not surge or oscillate and must not allow a freer flow of gas in one part than in another. To secure such steady uniform operation the supply of liquid to the vortex must be uniform in all parts and the supply of air to the vortex must also be uniform in all parts. A lack of such uniformity of supply of both liquid and gas results in surging and in violent rushes of gas through the apparatus without efficient washing or in difference in effectiveness in washing in different parts of the machine.

It has been found that high efficiency is attained through establishing liquid vortex in the form of an annulus through which annular vortex the gas to be cleaned must pass. The gas to be cleaned enters the vortex in annular form. Liquid fouled with foreign particles washed from the gas is constantly discharged from the vortex rearwardly and cleaned gas is discharged therefrom in the forward direction of travel of the gas stream. A meritorious feature is that an annular axially moving, liquid carrying gas stream is created and deflected radially in such a manner as to establish an annular vortex therein.

An important preferred characteristic is that the gas to be cleaned is advanced as an annular, axially moving stream, carrying entrained cleaning liquid, and at high velocity into an annular, radially extending, axially converging washing space. The velocity of the stream and the shape and size of the washing space is such that an annular, liquid vortex is set up within such space.

In the apparatus of this invention an especially efficient liquid vortex which is steady in operation and offers a uniform path to all parts of the gas stream flowing through the apparatus, is provided. The construction and operation is such that liquid is supplied uniformly throughout the extent of the vortex and a uniform flow of gas throughout the extent of the vortex is achieved.

The above objects, advantages, meritorious features and others, will more fully appear from the following description, appended claims and accompanying drawings, wherein:

Figure 1 is a vertical sectional view through a preferred form of apparatus embodying my invention.

Figures 2, 3, 4, and 5, are fragmentary sectional views taken on the same line as Figure 1 showing alternative means for exposing liquid to the gas stream.

Figure 9 is an enlarged fragmentary sectional view showing the water return from the washing zone.

Figure 4:
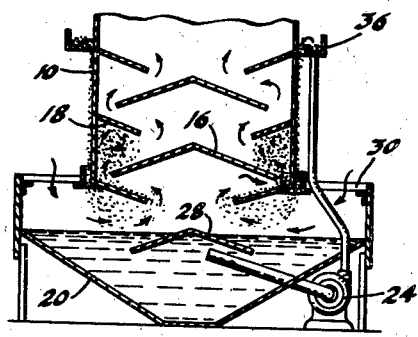

Figure 1 generally illustrates the invention and shows a vertical cylindrical housing 10 partially closed at the bottom by a downwardly inwardly extending truncated conical plate 12 the inner margin of which establishes a central gas passageway. The housing is closed at the top by plate 14 provided with a central outlet opening 15. Above the bottom member 12, within the housing are a plurality of spaced superposed crown baffles 16 supported from the housing by struts not shown. These baffles have their apexes centrally located and pointing upward. The circular edges of these baffles are concentric with the inside of the housing and spaced therefrom by annular openings. These crown baffles alternate with downwardly extending truncated conical annular baffle members 18 attached to the housing at their outer edges.

The cylindrical housing 10 superposes a cylindrical liquid tank 20. A fan 22, or other means, is arranged to draw the gases through the housing. Means is provided for continuously supplying liquid from the tank 20 to the gas stream below the lower baffle 16. Figures 1 to 5 inclusive illustrate different means for discharging liquid into the gas stream.

The proper arrangement and spacing of the baffles and the proper proportioning of the openings through and between the baffles and between the baffles and the housing, with regard to the volume of gas passing through the apparatus, are essential to proper operation. The size of the housing and the size of the openings will vary with the volume of gas handled per unit of time, but the general principles of construction and operation for all sizes will be apparent from the following description.

The alternating crown and annular baffles divide the space within the housing into an alternate series of circular axial spaces and circumferential annular spaces. The central spaces are circular with coned tops and truncated cone bottoms. The annular spaces converge radially inwardly of the housing. An essential feature of the invention consists in so arranging and proportioning these spaces and the openings connecting them with relation to the volume of flow of gas through said openings that the water supplied at an appropriate place in the lower part of the path of flow of the gas stream is continuously caught up by the gas stream and carried into the washing space between the lowermost crown baffle 16 and the annular baffle 18 immediately thereabove where it is whirled into an annular vortex. Liquid carrying particles washed from the gas are continuously discharged from the vortex and liquid is continuously delivered to the vortex by the entering gas stream. The finer spray or mist carried up from the vortex by the gas is caught and removed therefrom in its passage through the upper spaces by the baffles.

Referring to Figure 1 water from the tank 20 is continuously supplied by the pump 24 to a spray head 26 centrally located beneath the lowermost conical baffle. The pump inlet opening within the tank is shrouded from foul material falling directly thereinto by a baffle 28. The spray head sprays the water in a uniformly distributed radial spray curtain against the lower surface of the baffle where it is broken into a finer spray and uniformly distributed across the annular opening between the margin of the baffle and the housing. Air is drawn by the fan 22 through grating 30 downward toward the water in the tank and then upward through the opening in the plate 12 and uniformly radially outward and upward through the annular opening between the lowermost crown baffle and the housing into the annular space above said crown baffle. The gas moves upwardly through the chamber as indicated by the continuous flowlines and arrows.

The stream of air flowing through the housing is uniformly alternately divided and reunited as it passes upwardly through the chamber. The annular opening between the edge of the lowermost conical baffle 16 and the conical bottom plate 12 and the annular opening between the edge of said baffle and the housing are so proportioned to the volume of air flow that the speed of the air current through these openings is sufficient to pick up substantially all of the spray dashed from the underside of the baffle 16. This water is carried up into the annular space above said baffle forming a continuous annular liquid vortex within said space. The water flowing off the edge of baffle 16 falls into the current of gas to be again carried upward through the same cycle.

The annular opening between the baffle 18 and the baffle 16 and the opening in the center of baffle 18 are sufficiently larger than the openings into the vortex space that the velocity of the leaving air is so low therethrough that the main part of the water in the vortex is not carried upwardly and out with the gas but is dropped downwardly into the vortex. The positioning of the baffles 16 and 18 is such as to give the proper curved motion to the air flow as indicated in the drawings. The most rapid air flow is on the outside curves of the stream and this most rapid part of the air stream hugs the surfaces next to the outside of the stream curves, thus keeping the particles of water nearer the inner and slower parts of the air stream and away from the surfaces which deflect the stream flow.

Due to the annular shape of the washing space provided with an annular inlet and an annular outlet, the gas and liquid enter uniformly throughout and the gas leaves in the same uniform manner. By exercising proper control over volume and velocity surging or breaking through in an uneven manner is prevented.

After this vortex has been established the supply of water from the spray head may be cut off and the vortex will maintain itself for a very considerable length of time being only very slowly depleted by a relatively small escape by film flow down the upper surface of the bottom plate 12. This is mentioned only to show the permanence of the vortex and should not be done in practical operation.

To secure uniform operation provision must be made to secure a regular water outflow from the vortex chamber equal to the inflow. This outflow from the vortex may be secured by leakage down the upper surface of the plate 12 but is preferably secured by reducing the area of the inlet opening so as to increase the air velocity therethrough and by leaving a narrow annular opening between the upturned outer edge 13 of the plate 12 and the inside of the cylindrical housing. The plate 12 is supported spaced from the housing wall by bridge elements not shown. As the weight of water in the vortex increases with the continued supply from the spray head more and more water will escape through this opening down the inside of the housing wall until the equilibrium is automatically established between the supply to the vortex and the outflow from the vortex.

It will be apparent that sufficient water must be supplied to the vortex and withdrawn from the vortex to efficiently carry away the materials continuously washed out of the air stream otherwise the material washed out of the air would accumulate in the vortex until the fluid mixture in the vortex would become a mud or an emulsion depending upon the type of material washed out of the air stream. In practice a considerable excess of water must be circulated through the vortex above the minimum actually required to remove the material washed out of the air, but the supply from the spray head to maintain proper operating condition is relatively very small as compared to that required with washing apparatus which does not make use of a sustained vortex maintained as above described.

Considering Fig. 1 as an example, if the diameter of the housing were taken as 4 ft. the radial dimension of the inlet opening between the margin of the lowermost crown baffle 16 and the housing wall might be 3 inches and the vertical dimension of the outlet opening from the vortex space between said crown baffle 16 and the annular baffle 18 thereabove might be 12 inches and the volume of air drawn through the machine might be 6000 c. f. m. In the structures shown in the other figures of the drawings the dimensions might be similarly proportioned. The gas is taken into the washing space at such a velocity as to carry along most of the liquid discharged thereinto. Such a velocity is termed a high velocity. If 6000 c. f. m. of gas were taken through the machine of Figure 1, such machine having a diameter of 4 ft., the gas velocity might be 2500 ft. per minute through the annular inlet into the vortex space. Such figures, as well as machine dimensions, are illustrative only. The requirement is that the gas pick up the liquid and carry it into the washing space and that a vortex of swirling liquid be there established and maintained.

Above the vortex space the openings are made large enough so that the velocity of air flow therethrough is slow enough so that the water accumulated on the baffles will fall downward through the air stream. The sinuous flow of the air stream in contact with the surfaces of the baffles effectively removes the entrained particles of water before it reaches the outlet.

Two or more vortexes, one above the other, may be secured by suitable proportioning the openings as described in Fenn application Ser. No. 529,060, filed April 1, 1944. It will also be apparent that as many pairs of eliminator baffles and spaces above the vortex space as desired or necessary may be used.

Figure 5:
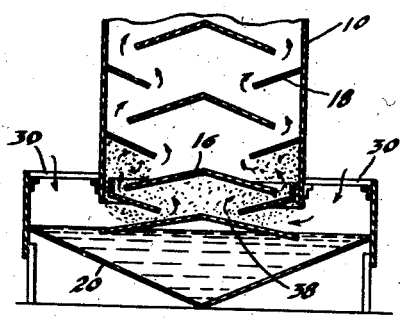

As previously noted a number of different devices and methods may be used to supply the liquid to form and maintain the vortex. A central spray head 26, such as above described in Figure 1, sending out a uniformly distributed radial spray may be used, or various other methods and devices may be used as shown in Figures 2 and 5 inclusive. In Figure 2, the water is supplied by the pump to a distributing cap 32 above the apex of the lowermost conical baffle 16 and flows uniformly down the upper surface of the baffle and from the circular edge thereof into the stream of air passing through the annular inlet opening and is picked up and swirled about within the washing space as previously described.

By the means described the most uniform and efficient operating conditions are maintained in an apparatus that because of its circular, and conical construction is simple, compact and rigid and which is easily constructed and may be operated with a minimum of attention and upkeep.

If desired a spraying basket or other spraying device 34, as shown in Fig. 3, placed centrally beneath the baffle 16 and rotating about a vertical axis may be used. The basket shaft may be rotated by any suitable means. In this case the water is supplied by the pump from the tank to the spraying device as shown. The rotating basket throws a uniformly distributed radial spray out into the peripheral portion of the space where it is picked up by the air stream and carried up from the vortex as described.

In Figure 4, the water is delivered to an external annular launder 36 and overflows uniformly around the launder through the narrow annular space between the inner wall of the launder and the housing and down the outside wall of the housing and lower surface of the coned plate 12 into the air stream. The air opening below plate 12 is such that the air stream has sufficient speed to pick up the water and carry it upward into the vortex space. The water not initially carried into the vortex space but striking the under surface of the baffle 16 flows down the underside of this baffle and from its lower edge into the air stream and is thus carried up into the vortex space. It will be apparent that if preferred the launder may be placed inside the shell. As shown, the water discharged from the launder washes the outside of the housing.

If desired the pump may be eliminated and the method and arrangement shown in Figure 5 may be used. In this case the water level is kept at such a height as to maintain a narrow circular opening between the lower circular edge of the bottom plate 12 and the water surface. A flat cone 38 is placed with its apex extending up into the opening in plate 12 and at such a level that its surface just beneath the circular edge of the plate 12 is at approximately the level of the water. The spacing is such that the velocity of the air passing inwardly beneath the plate 12 is sufficient to pull water up to the sloping upper surface of the cone 38 and pick it up as a spray and carry it into the vortex space as shown. In this case the water discharged from the vortex is delivered into the slower portion of the air current through which it falls into the tank.

Figure 6:
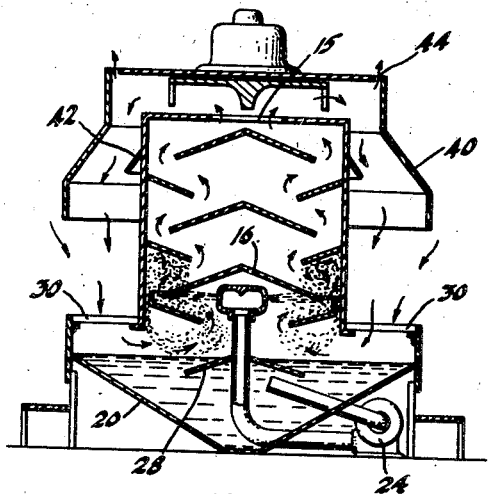
Figure 6 is a vertical sectional view taken on the same line as Figure 1 through a modified form of construction.

For use in spray booths and similar devices in which the greater portion of the washed air may be continuously recirculated through the apparatus to pick up the paint or other material in suspension, the invention may be arranged as shown in Figure 6. In this figure the baffles and means for supplying the water to the vortex are as heretofore described. Any of the arrangements shown in Figures 1 to 5 may be used.

In this type of apparatus in order to secure a uniform return flow of air around the entire periphery of the machine and down through the grating 30 an external circular jacket 40 concentric with the housing is provided. This jacket may be supported from the housing and shaped to direct the air through the grating 30 as shown. A fan is placed above the outlet from the housing and draws the air through opening 15 and delivers it uniformly into the upper part of the jacketed space. A downwardly sloping plate 42 may be provided placed to deflect the annular stream of air as illustrated.

The air is circulated through the apparatus as shown by the flow lines and arrows, passing from the fan uniformly outward and then downward through the annular jacketed space and down through the grating 14 and uniformly inward and then upward through the vortex and baffle spaces as previously described. In order to secure an inflow of outside air from below the jacket 40 part of the air from the fan may be discharged upwardly through the narrow annular slot 44 in the outer edge of the fan cover.

Figure 7:
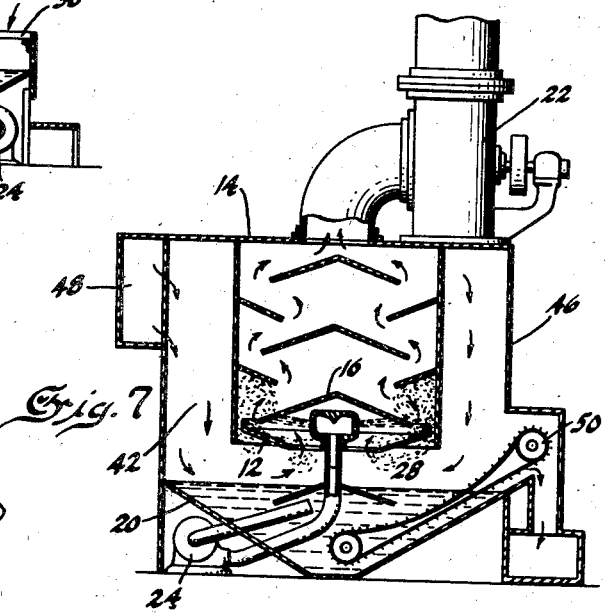
Figure 7 is a vertical sectional view taken on the same line as Figure 1 through a second modified form of construction.
Figure 8:
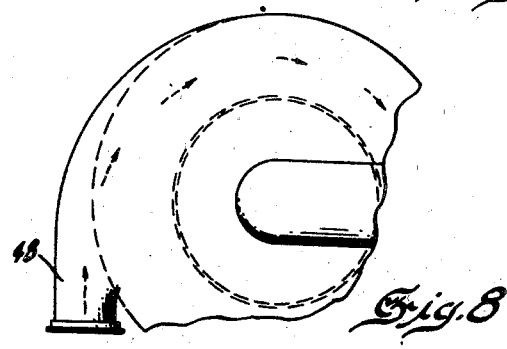
Figure 8 is a broken away top plan view of Figure 7.

For use in washing gases conveyed to the apparatus from a distance through conduits, the invention may be arranged as shown in Figures 7 and 8. In these figures the baffles and means for supplying the water to the vortex are as heretofore described and any of the arrangements shown in Figures 1 to 5 may be used. In this case the apparatus is entirely closed except for inlet and outlet openings for the gas stream. The housing 10 is surrounded by a concentric outer jacket 46 which encloses the entire apparatus and extends down to meet the upper edge of the tank. The top plate 14 exends outward and closes the jacketed space. The incoming air is admitted to the upper part of the jacketed space tangentially through the inlet conduit 48 as indicated in the top plan view of Fig. 8 so as to secure a uniform distribution of the stream of air down through the annular jacketed space 42 and uniformly into the space above the water level and inwardly and upwardly therethrough and through the liquid spray into the vortex. An exhaust fan 22 creates the air flow. If desired the apparatus may be equipped with a drag 50 for removal of the sludge material from the tank as shown.

From the foregoing description it will be evident, that my invention is particularly adapted to the securing of very uniform and constant operating conditions not obtainable in the longitudinal and rectangular types of washers now in common use, that it secures a completely uniform flow of gases through similar parts of the device and a uniform distribution of washing liquid in all similar parts of the device so as to secure a constant uniform treatment of all parts of the gas stream by the washing liquid, which cannot be secured in rectangular washing or scrubbing apparatus of the types commonly used in which surging and by-passing of gas and uneven operation occur due to lack of uniformity in the passage of the gases and supply of liquid to all similar parts of the apparatus.

From the foregoing it will also be evident that my invention secures and maintains a special type of liquid vortex which is annular in shape (i. e. closed upon itself and without ends) and constant and uniform in operation and similar in action in all its parts, results which cannot be obtained in rectangular apparatus in which the conditions at the ends of the apparatus are necessarily different to those in the middle resulting in a lack of uniform treatment of the gas stream. The circular, annular and conical type of construction used in my invention is much more rigid than can be secured in rectangular types and may therefore be made of lighter construction and with less waste of material than with rectangular forms and also the type of construction used in my invention is not nearly as subject to damage from vibration.

A great advantage of my invention is that it is uniform in operation under different plant conditions which is not the case with washers of the rectangular type. For example with long lengths of conduit conducting the gas to rectangular washers it is substantially impossible to secure uniform conditions in the washer due to the speed of the incoming air stream and the unsymmetrical distribution of the gas to similar parts of the apparatus. My apparatus is not subject to such vagaries and will give the same uniform results under the different conditions of installation, thus saving considerable trouble and expense in adjusting the apparatus to different conditions in different plants.

What I claim is:

1. Gas washing apparatus comprising, in combination, a liquid reservoir, an upright cylindrical housing superposing said reservoir and having a gas inlet adjacent to its bottom and a gas outlet adjacent to its top, said cylindrical housing being spaced from the reservoir on all sides to form a restricted gas passage therebetween, an annular baffle extending inwardly and downwardly from the housing wall terminating above the water level in the reservoir and defining a central gas inlet into the housing, an upwardly crowned baffle positioned within the housing spaced above said central gas inlet extending outwardly and downwardly toward the housing wall superposing the first annular baffle and terminating at a slight distance therefrom equally on all sides to form a restricted annular gas inlet into the space above said crown baffle, a second annular baffle spaced above the crown baffle extending inwardly and downwardly from the housing wall superposing the crown baffle and terminating spaced thereabove defining therewith an annular gas outlet passageway from the space between said annular baffle and the crown baffle of greater sectional area than the annular gas inlet into said space, and means for directing a liquid spray uniformly circumferentially into the space between the first annular baffle and the crown baffle, and means for causing a gas stream to enter the bottom of said housing above the reservoir and flow upwardly through the housing at a velocity that it picks up the sprayed liquid and carried it through said circular gas inlet into said space above the crown baffle where both the air stream and the liquid carried therein is deflected downwardly by said second annular baffle and caused to be whirled about in a violent annularly shaped vortex before the gas stream discharges therefrom at a reduced speed insufficient to carry the liquid therewith through said gas outlet passageway.

2. Gas washing apparatus comprising, in combination, a liquid reservoir, a cylindrical housing superposing said reservoir, an annular baffle extending inwardly and downwardly from the housing wall and provided with a central gas inlet into the housing, a crown baffle superposing said central inlet and extending outwardly and downwardly from the axis of the housing and terminating spaced above the outer marginal portion of said annular baffle and spaced from the housing wall defining an annular gas inlet into the space above said crown baffle, a second annular baffle extending inwardly and downwardly from the housing wall superposing the crown baffle and terminating spaced thereabove and defining therewith an annular washing space provided with a gas outlet passageway between the margin of the second annular baffle and the crown baffle of greater cross sectional area than the gas inlet passageway into said washing space, means for discharging liquid against the under side of said crown baffle uniformly around the margin thereof, and means for drawing gas downwardly into the reservoir and upwardly through said housing.

3. Gas washing apparatus comprising, in combination, a liquid reservoir, a cylindrical housing superposing said reservoir provided with a gas inlet at the bottom and a gas outlet at the top, a crown baffle disposed axially within said housing adjacent to the bottom extending outwardly and downwardly and terminating spaced from the housing wall defining an annular gas passageway into the housing above the baffle, an annular baffle projecting inwarly and downwardly from the housing wall defining with the crown baffle an annular washing space above the crown baffle, said annular baffle terminating spaced above the crown baffle defining an annular gas outlet from said washing space, means for drawing gas downwardly into the reservoir circumferentially about the housing and upwardly through the housing means spaced about the top outlet from the housing having a skirt encircling the housing adapted to direct a portion of the gas exhausted from the outlet downwardly into the gas inlet at the bottom of the housing, and means for discharging liquid into the gas stream adjacent to the gas inlet into the annular washing space.

4. Gas washing apparatus comprising, in combination, a liquid reservoir, a housing superposing said reservoir and having a gas inlet at the bottom and a gas outlet at the top, said reservoir having a gas inlet thereinto encircling said housing, means for drawing gas downwardly into the reservoir and upwardly through the housing, means for delivering liquid into the gas stream entering the housing, and means encircling the housing for directing a portion of the gas exhausted from the top thereof downwardly into the reservoir through the gas inlet encircling the housing.

5. Apparatus for washing gases to remove particles of foreign matter from said gases which consists of: a vertical cylindrical housing enclosing washing and eliminating spaces; a cover closing said housing at the top with a centrally located gas outlet opening; a downwardly extending truncated conical bottom plate closing said housing at the bottom with its lower edge forming a central horizontal circular gas inlet opening, a conical baffle plate centrally placed within said housing above said bottom with the apex upward and with its lower outer circular edge forming a horizontal annular opening between said edge and the cylindrical housing and a vertical cylindrical opening between said edge and above said bottom plate; a downwardly extending truncated conical baffle plate within said housing above said last conical plate and attached to said housing at its upper circular inner edge and with its lower edge forming a central horizontal circular opening and defining a vertical cylindrical gas passage between said last lower circular edge and said last conical baffle, with said opening between said lower edge of said conical baffle and said bottom plate and said cylindrical housing of such area with respect to the gas flow to be passed through said openings that liquid introduced into said gas stream near said openings will be carried up into the annular space beneath above said truncated conical baffle and with the areas of said central opening in above said truncated conical baffle and the opening between said lower edge of said truncated conical baffle and first said conical baffle of such area with regard to the volume of gas to be passed through said openings that liquid falling into said gas stream from said lower edge of said truncated baffle plate will fall through said gas stream and will not be carried upward with said gas stream, a cylindrical liquid basin beneath and centrally located with regard to said cylindrical housing, means for supplying a spray of liquid from said basin uniformly and equally to all parts of the gas stream passing through said opening between said lower edge of said conical baffle and said bottom plate, means for withdrawing liquid from the annular space beneath first said truncated conical baffle plate, alternate pairs of upwardly extending conical and downwardly extending truncated conical baffle plates in said housing above first said pair of such baffles so spaced from each other and from said housing with regard to said flow of gas to be passed through said apparatus that liquid falling from the lower edges of said baffle plates will not be carried upward with said gas stream but will pass downward to said space beneath first said truncated conical baffle, means for drawing gas to be cleaned downward into the upper part of said liquid basin above the liquid in said basin and upward through said opening in said bottom plate and upward through the spaces enclosed by said cylindrical housing between said baffle plates and out through said outlet opening at a velocity sufficient to pick up said spray of liquid and carry it through the annular opening between the lower outer edge of said first conical baffle plate and the housing wall into the annular space under said truncated conical baffle plate immediately thereabove where it is whirled about in an annularly-shaped vortex, but at a velocity insufficient to carry the liquid out off the vortex as the gas stream resumes its upward course through the housing.

6. Gas washing apparatus comprising, in combination, an upright cylindrical housing having a gas inlet at the bottom and a gas outlet at the top, a cone-shaped baffle positioned axially within the housing adjacent the bottom thereof and having its perimeter spaced slightly from the wall of the housing an equal distance therearound to form a restricted circular inlet opening, an annular baffle superposing said cone baffle and extending at an incline inwardly and downwardly from the housing wall toward and over the outer portion of the cone baffle and having its inner lower edge spaced from the cone baffle a distance substantially greater than said inlet opening to form a circular outlet opening, means exposing liquid adjacent to said inlet opening, and means for causing gas fouled with particles to enter the bottom of said housing and flow through said circular inlet opening at a velocity that it picks up the liquid exposed thereto and carries it up into the area between said baffles where it is deflected downwardly by said annular baffle and caused to be whirled around in an annular vortex between the baffles before the gas discharges therefrom at a slower rate of speed through said wider circular outlet.

7. Gas washing apparatus comprising, in combination, a liquid reservoir, an upright cylindrical housing superposing said reservoir and having a radial dimension such that the reservoir extends beyond the housing on all sides thereof, a cone-shaped baffle positioned axially within said housing adjacent to its bottom and having its perimeter spaced slightly from the wall of the housing an equal distance therearound to form a restricted annular inlet opening, an annular baffle positioned within the housing spaced above said cone baffle extending at an incline inwardly and downwardly from the housing wall toward and over the outer portion of the cone baffle and having its inner perimeter spaced from the cone baffle a distance substantially greater than the said inlet opening to form an annular outlet opening substantially wider than said inlet opening, a second annular baffle below said cone-shaped baffle extending at an incline inwardly and downwardly from said annular inlet opening and defining with the cone baffle an annular passageway converging outwardly toward the annular inlet opening, means for taking liquid from said reservoir and discharging the same equally circumferentially adjacent to said annular inlet opening, and means for causing gas fouled with particles to enter the bottom of said housing above said reservoir and flow through said converging passageway and through said inlet opening at a velocity that it picks up the liquid discharged adjacent the latter and carries it up into the area between said cone baffle and the annular baffle thereabove where it is deflected downwardly by the latter and caused to be whirled around in an annular vortex before the gas discharges from the area at reduced speed through said annular outlet opening.

8. Gas washing apparatus comprising, in combination, a liquid reservoir, an upright cylindrical housing superposing said reservoir and having a radial dimension such that the reservoir extends beyond the housing on all sides thereof, a plurality of vertically spaced cone-shaped baffles positioned axially within said housing, the lowermost baffle having its outer edge spaced slightly from the wall of the housing an equal distance therearound to form a restricted circular inlet opening, a plurality of vertically spaced annularly-shaped baffles arranged axially in said housing and alternating in position with said cone baffles, said annularly shaped baffles extending at an incline inwardly and downwardly from the wall of the housing and partially overlapping the cone baffle, the lowermost annular baffle disposed below the lowermost cone baffle and provided with a substantially vertical portion on the outer edge thereof rising into said circular inlet opening in spaced relation to both the outer edge of the cone baffle and the wall of the housing, means for continuously taking liquid from said reservoir and discharging the same in equal amounts adjacent to all portions of said circular inlet opening, and means for causing gas fouled with particles to enter the bottom of the housing above the reservoir and flow upwardly therethrough at such a velocity that it picks up the liquid discharged adjacent to the circular inlet opening and carries it therethrough into the area between the lowermost cone baffle and the immediately superposing annular baffle where it is swirled about in an annularly shaped vortex before the gas leaves the area for further passage through the housing, the spaced relation of said vertical portion of the lowermost annular baffle with respect to the wall of the housing forming an annular escape vent for the return of liquid from said vortex to the reservoir.

9. Gas washing apparatus comprising, in combination, a cylindrical tank for holding a reservoir of liquid, an upright cylindrical housing superposing said cylindrical tank in concentric relation thereto arranged with its lower edge substantially on the level with the upper edge of the tank and having a radial dimension less than that of the tank to form an annular gas inlet into the bottom of the housing, a series of vertically spaced cone-shaped baffles positioned axially in the housing with the apexes thereof extending upwardly on the axis of the housing and being of less radial dimension than the housing to form annual openings between the outer margins of the baffles and the wall of the housing, a series of inclined annularly-shaped baffles positioned axially in the housing in alternate staggered relation to the cone baffles and extending inwardly and downwardly from the wall of the housing toward the axis thereof but terminating short of the axis to form central openings in the housing for the passage of gas, the lowermost annual baffle being below the lowermost cone baffle on substantially the level of the bottom of the housing, means for continuously taking liquid from said liquid reservoir and directing the liquid thus taken in equal amounts across the lowest annular opening formed between the margin of the lowermost cone baffle and the housing wall, and means for causing a gas stream to be cleaned to flow downwardly around the outside of the housing into the tank and thence upwardly through the housing between the baffles at such a velocity that it picks up said liquid exposed at said lowest annual opening and carries it into the space under the annual baffle immediately superposing the opening where both the liquid and gas are deflected downwardly thereby and caused to be swirled around in a vortex motion before the gas continues into upward passage through the housing.

10. Gas washing apparatus comprising, in combination, a cylindrical tank for holding a reservoir of liquid, an upright cylindrical housing superposing said cylindrical tank in concentric relation thereto arranged with its lower edge substantially on the level with the upper edge of the tank and having a radial dimension less than that of the tank to form an annular gas inlet into the bottom of the housing, a series of vertically spaced cone-shaped baffles positioned axially in the housing with the apexes thereof extending upwardly on the axis of the housing and being of less radial dimension than the housing to form annual openings between the outer margins of the baffles and the wall of the housing, a series of inclined annularly-shaped baffles positioned axially in the housing in alternate staggered relation to the cone baffles and extending inwardly and downwardly from the wall of the housing toward the axis thereof but terminating short of the axis to form central openings in the housing for the passage of gas, the lowermost annual baffle being below the lowermost cone baffle on substantially the level of the bottom of the housing and having its outer marginal portion rising substantially vertically into the annual opening formed at the outer margin of the lowest cone baffle in spaced relation thereto and the wall of the housing, a spray head located below the apex of the lowest cone baffle and arranged to direct a spray of liquid radially toward the outer margin thereof, means for continuously taking liquid from the reservoir and delivering the same to said spray head for discharge thereby, and means for causing a gas stream to flow downwardly into said annular gas inlet of the tank and thence upwardly through the housing between the baffles into such velocity that it picks up the liquid spray discharged by said head and carries it upwardly into the space between the lowest cone baffle and next above annual baffle where it is deflected by the latter and caused to be swirled around in a vortex motion before the gas continues its upward passage through the housing.

NIELS C. CHRISTENSEN.